United States Patent
Rosciano et al.

(10) Patent No.: US 9,184,465 B2
(45) Date of Patent: Nov. 10, 2015

(54) ION CONDUCTOR AND SOLID STATE BATTERY

(75) Inventors: Fabio Rosciano, Brussels (BE); Paolo Prospero Pescarmona, Leuven (BE); Andre' Persoons, Holsbeek (BE)

(73) Assignees: TOYOTA JIDOSHA KABUSHIKI KAISHA, Toyota (JP); KATHOLIEKE UNIVERSITEIT LEUVEN, Leuven (BE); CSTI. COMM. V, Holsbeek ( * ) Notice: Subject to any disclaimer, the term of this patent is extended or adjusted under 35 U.S.C. 154(b) by 348 days.

(21) Appl. No.: 13/511,877

(22) PCT Filed: Feb. 1, 2011

(86) PCT No.: PCT/JP2011/052460
§ 371 (c)(1),
(2), (4) Date: May 24, 2012

(87) PCT Pub. No.: WO2011/142150
PCT Pub. Date: Nov. 17, 2011

(65) Prior Publication Data
US 2013/0045426 A1   Feb. 21, 2013

(30) Foreign Application Priority Data

May 10, 2010 (JP) .................. 2010-108570

(51) Int. Cl.
*H01M 6/18* (2006.01)
*H01M 10/0562* (2010.01)
(Continued)

(52) U.S. Cl.
CPC .......... *H01M 10/0562* (2013.01); *C01F 7/002* (2013.01); *C01F 7/162* (2013.01); *C01G 9/006* (2013.01); *H01B 1/08* (2013.01); *H01M 6/185* (2013.01); *H01M 6/186* (2013.01);
(Continued)

(58) Field of Classification Search
CPC . H01M 6/18; H01M 10/3918; H01M 10/052; H01M 10/0525; H01M 4/485; H01M 4/581; H01M 6/185; H01M 4/36
USPC ........................ 429/320, 218.1, 319, 321, 322
See application file for complete search history.

(56) References Cited

U.S. PATENT DOCUMENTS

| 4,507,371 A | 3/1985 | Thackeray et al. |
| 2008/0055715 A1 | 3/2008 | Fei et al. |

(Continued)

FOREIGN PATENT DOCUMENTS

CN   101 521 296 A   9/2009

OTHER PUBLICATIONS

Lutz et al., "Chloride Spine's: A New Group of Solid Lithium Electrolytes," *Journal of Physical Chemistry of Solid*, vol. 42, pp. 287-289, 1981.

(Continued)

*Primary Examiner* — Patrick Ryan
*Assistant Examiner* — Angela Martin
(74) *Attorney, Agent, or Firm* — Oliff PLC

(57) ABSTRACT

A main object of the present invention is to provide an ion conductor which has excellent ion conductivity and high electrochemical stability. The present invention resolves the problem by providing an ion conductor represented by a general formula: $(A_xM_{1-x-y}M'_y)Al_2O_4$ ("A" is a monovalent metal, "M" is a bivalent metal, "M'" is a trivalent metal, and "x" and "y" satisfy relations: $0<x<1$, $0<y<1$, and $x+y<1$) and having a spinel structure.

8 Claims, 4 Drawing Sheets

(51) Int. Cl.
    *C01F 7/00*     (2006.01)
    *C01F 7/16*     (2006.01)
    *C01G 9/00*     (2006.01)
    *H01B 1/08*     (2006.01)

(52) U.S. Cl.
    CPC ......... *C01P2002/32* (2013.01); *C01P 2002/50* (2013.01); *C01P 2002/72* (2013.01); *C01P 2002/86* (2013.01); *C01P 2006/40* (2013.01); *H01M 2300/0071* (2013.01)

(56) References Cited

U.S. PATENT DOCUMENTS

2011/0200848 A1* 8/2011 Chiang et al. ............... 429/4
2011/0274948 A1* 11/2011 Duduta et al. ............. 429/50
2013/0344367 A1* 12/2013 Chiang et al. ............ 429/101

OTHER PUBLICATIONS

Kanno et al., "Ionic Conductivity of Solid Lithium Ion Conductors with the Spinel Structure: $Li_2MCl_4$ (M=Mg, Mn, Fe, Cd)," *Material Research Bulletin*, vol. 16, pp. 999-1005, 1981.

Kanno et al., "Ionic Conductivity and Phase Transition of the Spinel System $Li_{2-2x}M_{1+x}Cl_4$ (M=Mg, Mn, Cd)," *Journal of the Elctrochemical Society, Electrochemical Science and Technology*, pp. 469-474, Mar. 1984.

Murphy et al., "Cation diffusion in magnesium aluminate spinel," *Solid State Ionics*, vol. 180, pp. 1-8, 2009.

Iqbal et al., "Effect of doping of divalent and trivalent metal ions on the structural and electrical properties of magnesium aluminate," *Materials Science and Engineering B*, vol. 136, pp. 140-147, 2007.

International Search Report issued in International Patent Application No. PCT/JP2011/052460 dated Jun. 29, 2011.

* cited by examiner

US 9,184,465 B2

ION CONDUCTOR AND SOLID STATE BATTERY

TECHNICAL FIELD

The present invention relates to an ion conductor which has excellent ion conductivity and high electrochemical stability.

BACKGROUND ART

With the recent rapid spread of information processing-related devices and communication devices such as personal computers, video cameras, and mobile phones, importance placed on developments of batteries used as power sources for the above-mentioned devices has been increasing. Further, in the industry fields such as automobile industry, developments of batteries having high output and high capacity for electric vehicles or hybrid cars have been made. Currently, lithium batteries are attracting attentions from a viewpoint that they have high energy density among the various batteries.

The lithium batteries currently available in the market use a liquid electrolyte containing a flammable organic solvent. As such, they require installation of a safety device to inhibit the temperature rise at the time of short circuit or improvement in technical structure or materials to inhibit short circuit. In contrast thereto, a lithium battery having its battery all solidified by changing the liquid electrolyte to a solid electrolyte layer does not use a flammable organic solvent in the battery. Accordingly, it is possible to simplify the safety device and thereby thought to be good in production cost and productivity.

As the ion conductor (solid electrolyte material), an ion conductor having a spinel structure is known. The spinel structure is a structure represented by a general formula $AB_2X_4$, in which "X" is an anion of $16^{th}$ and $17^{th}$ group elements (such as $O^{2-}$, $S^{2-}$, and $Cl^-$); "B" is a metal cation provided to an octa-hedral site (such as $Al^{3+}$, $Mn^{3+}$, and $Ti^{4+}$); and "A" is a metal cation provided to a tetra-hedral site (such as $Li^+$, $Mg^{2+}$, $Zn^{2+}$.

Active researches have been made on the ion conductor having the spinel structure. For example, Patent Document 1 discloses the ion conductor which is represented by $Li_{2x}Zn_{1-x}(Al_2)O_4$. Further, an ion conductor which has an inverse-spinel structure is known. For example, Non-Patent Documents 1 to 3 disclose the ion conductor containing $Cl^-$ as an anion.

PRIOR ART

Patent Document

Patent Document 1: U.S. Pat. No. 4,507,371

Non-Patent Document

Non-Patent Document 1: H. D. Lutz et al., "CHLORIDE SPINELS: A NEW GROUP OF SOLID LITHIUM ELECTROLYTES", Journal of Physical Chemistry of Solid, Vol. 42, 287-289, 1981
Non-Patent Document 2: R. Kanno et al., "IONIC CONDUCTIVITY OF SOLID LITHIUM ION CONDUCTORS WITH THE SPINEL STRUCTURE: $Li_2MCl_4$ (M=Mg, Mn, Fe, Cd)", Material Research Bulletin, Vol. 16, 999-1005, 1981
Non-Patent Document 3: Ryoji Kanno et al., "Ionic Conductivity and Phase Transition of the Spinel System $Li_{2-2x}M_{1+x}Cl_4$ (M=Mg, Mn, Cd)", Journal of The Electrochemical Society, Electrochemical Science And Technology, 469-474, March 1984

DISCLOSURE OF THE INVENTION

Problems to be Solved by the Invention

Patent Document 1 discloses the ion conductor which is represented by $Li_{2x}Zn_{1-x}(Al_2)O_4$. This ion conductor has a problem that it is structurally difficult for the Li ion to move because the ion conductor has its x number (s) of $Zn^{2+}$ substituted by double numbers of 2x of $Li^+$, so that its Li ion conductivity becomes low. Further, ion conductors which contain $Cl^-$ as an anion are disclosed in the Non-Patent Documents 1 to 3, but such materials have problems of having low electrochemical stability and being poor in practicality. The present invention was attained in view of the above-mentioned problems, and a main object thereof is to provide an ion conductor which has excellent ion conductivity and high electrochemical stability.

Means for Solving the Problems

To resolve the above-mentioned problems, the present invention provides an ion conductor represented by a general formula: $(A_xM_{1-x-y}M'_y)Al_2O_4$ ("A" is a monovalent metal, "M" is a bivalent metal, "M'" is a trivalent metal, and "x" and "y" satisfy relations: 0<x<1, 0<y<1, and x+y<1) and having a spinel structure.

In the present invention, the ion conductor has a structure where (x+y) numbers of $M^{2+}$ are substituted by x number (s) of $A^+$ and y number (s) of $M'^{3+}$. Thus, it is structurally easy for A ions to move and the ion conductivity becomes excellent. Accordingly, the ion conductor of the present invention is better in its structure compare to that of $Li_{2x}Zn_{1-x}(Al_2O_4$ which has a structure where x number (s) of $Zn^{2+}$ is substituted by double numbers of 2x of $Li^+$. Further, because the ion conductor of the present invention contains $O^{2-}$ as an anion, it has an advantage of having higher electrochemical stability compare to an ion conductor which contains $Cl^-$ as an anion.

In the above-mentioned invention, the relation x=y is preferably established in the above-mentioned general formula.

In the above-mentioned invention, the "A" is preferably $Li^+$ in the general formula.

In the above-mentioned invention, the "M" is preferably at least one of $Mg^{2+}$ and $Zn^{2+}$ in the general formula.

In the above-mentioned invention, the "M'" is preferably $Al^{3+}$ in the general formula.

Further, the present invention provides a solid state battery comprising: a cathode active material layer containing a cathode active material, an anode active material layer containing an anode active material, and a solid electrolyte layer formed between the cathode active material layer and the anode active material layer, wherein at least one of the cathode active material layer, the anode active material layer, and the solid electrolyte layer has the above-mentioned embodiment for ion conductor.

According to the present invention, by using the above-mentioned ion conductor, it is possible to obtain a solid state battery having excellent output characteristics and high electrochemical stability.

In the above-mentioned invention, it is preferable that the solid electrolyte layer contains the ion conductor, and at least one of the cathode active material and the anode active material has the spinel structure. As the ion conductor contained in the solid electrolyte layer has the spinel structure and the active material contained in the active material layer also has the spinel structure, it is possible to reduce the interface resistance between the solid electrolyte layer and the active material layer.

In the above-mentioned invention, it is preferable that the ion conductor is a Li ion conductor, the cathode active material which has the spinel structure is $LiMn_2O_4$, and the anode active material which has the spinel structure is $Li_4Ti_5O_{12}$.

Effects of the Present Invention

In the present invention, an effect of obtaining an ion conductor which has excellent ion conductivity and high electrochemical stability is attained.

PREFERRED MODE OF THE INVENTION

Figure 1:
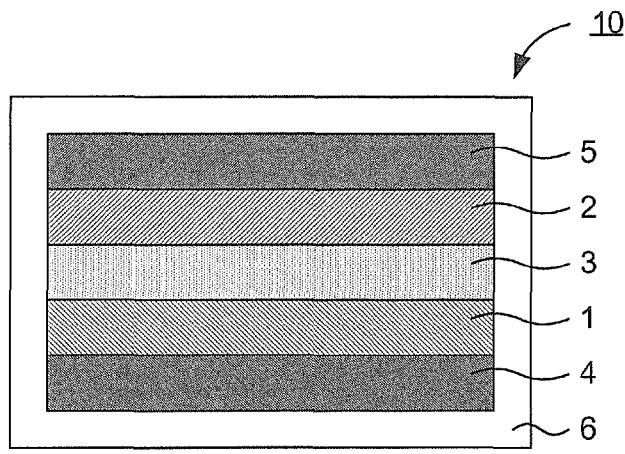
FIG. 1 is a cross-schematic view illustrating one example of the solid state battery of the present invention.

Hereinafter, an ion conductor and a solid state battery of the present invention will be explained in detail.
A. Ion Conductor First, an ion conductor of the present invention will be explained. The ion conductor of the present invention is represented by a general formula: $(A_xM_{1-x-y}M'_y)Al_2O_4$ ("A" is a monovalent metal, "M" is a bivalent metal, "M'" is a trivalent metal, and "x" and "y" satisfy relations: $0<x<1$, $0<y<1$, and $x+y<1$) and having a spinel structure.

According to the present invention, because the ion conductor has a structure where (x+y) numbers of $M^{2+}$ is substituted by x number (s) of $A^+$ and y number (s) of $M'^{3+}$, it is structurally easy for the A ions to move, and thus, the ion conductivity becomes excellent. Accordingly, the ion conductor of the present invention is better in its structure compare to that of $Li_{2x}Zn_{1-x}(Al_2)O_4$ which has a structure where x number (s) of $Zn^{2+}$ is substituted by double numbers of 2x of $Li^+$. Further, because the ion conductor of the present invention contains $O^{2-}$ as an anion, it has an advantage of having higher electrochemical stability compare to an ion conductor which contains $Cl^-$ as an anion.

Further, from the view point of ion conductivity, the existence of a free site in a crystal is important. Here, it is possible to modify a spinel structure represented by a general formula $AB_2X_4$ with a spinel structure represented by a general formula $A_{1+x}B_2X_4$. However, in this case, since A cation is provided to the fee octa-hedral site, it is possible that the ion conductivity as a whole lowers. In contrast thereto, in the present invention, it is possible to keep a fee site (s) important for ion conductivity because the present invention has the above-mentioned general formula. Moreover, in general, it is essential for an ion conductor to have insulation properties when an ion conductor is used as a solid electrolyte material of a solid electrolyte layer of a battery. In contrast thereto, with the ion conductor of the present invention, it is easy to obtain an ion conductor having excellent insulation properties because a generally well-known insulating material can be used therein as a starting material.

The ion conductor of the present invention is represented by a general formula: $(A_xM_{1-x-y}M'_y)Al_2O_4$ ("A" is a monovalent metal, "M" is a bivalent metal, "M'" is a trivalent metal, and "x" and "y" satisfy relations: $0<x<1$, $0<y<1$, and $x+y<1$). In the above-mentioned general formula, the "A" is a monovalent metal which functions as a mobile cation. As examples of "A", $Li^+$, $Na^+$, and $K^+$ are cited, and $Li^+$ and $Na^+$ are preferable and $Li^+$ is more preferable. Further, in the above-mentioned general formula, the "M" is a bivalent metal which functions as a structural cation. The "M" is not particularly limited as long as it is a bivalent metal and may be an alkaline-earth metal, a transition metal, or a metalloid. It is preferable that the "M" is specifically at least one selected from the group consisting of: $Mg^{2+}$, $Ca^{2+}$, $Sr^{2+}$, $Zn^{2+}$, and $Cd^{2+}$, and is more preferable to be at least one of $Mg^{2+}$ and $Zn^{2+}$. Further, in the above-mentioned general formula, the "M'" is a trivalent metal which functions as a framework cation. Moreover, the "M'" is not particularly limited as long as it is a trivalent metal and may be a transition metal or a metalloid. It is preferable that the "M'" is specifically at least one selected from the group consisting of $Al^{3+}$, $B^{3+}$, $Ga^{3+}$, $In^{3+}$, $Sc^{3+}$, and $Y^{3+}$; is more preferable to be at least one of selected from the group consisting of $Al^{3+}$, $B^{3+}$, $Ga^{3+}$, and $In^{3+}$; and is further more preferable to be $Al^{3+}$.

In the above-mentioned general formula, "x" generally satisfy the relation $0<x$. Further, "x" generally satisfy the relation $x<1$, preferably satisfy the relation $x<0.5$, and more preferably satisfy the relation $x\leq0.40$, and even more preferably satisfy the relation $x\leq0.25$. In the above-mentioned general formula, "y" generally satisfy the relation $0<y$. Further, "y" generally satisfy the relation $y<1$, preferably satisfy the relation $y<0.5$, and more preferably satisfy the relation $y\leq0.40$, and even more preferably satisfy the relation $x\leq0.25$. Further, "x+y" generally satisfy the relation $x+y<1$ in the above-mentioned general formula. Moreover, "x" and "y" may be the same of different. It is preferable that "x" and "y" establish a relation (x=y) because electroneutrality is maintained easily. In other words, even when double x numbers of M (bivalent metal) is substituted by x number (s) of A (monovalent metal) and x numbers of M' (trivalent metal), the electroneutrality is maintained.

Still further, when a relation of $M=Mg^{2+}+Zn^{2+}$ is established in the above-mentioned general formula for example, the general formula can be represented by $(A_x(Mg_\alpha Zn_{1-\alpha})_{1-x-y}M'_y)Al_2O_4$. Here, a generally satisfy the relation $0<\alpha<1$.

One of the characteristics of the ion conductor of the present invention is to have the spinel structure. The spinel structure in the ion conductor of the present invention is decided by, for example, an X-ray diffraction (XRD). Further, the ion conductor of the present invention is not particularly limited as long as it has the spinel structure, but it is preferably be polycrystal, and most preferably and ideally be single crystal. Thereby no resistance increase in crystal grain boundary is caused. The ion conductor of the present invention can exhibit sufficiently excellent ion conductivity even if the conductor is of polycrystal because it has three-dimensional ion conductivity.

Further, a shape of the ion conductor is not particularly limited. For example, a particle-form can be cited, and in particular, a sphere-form or an oval sphere-form is preferable. When the ion conductor is in sphere-form, the average particle diameter is, for example, preferably within the range of 0.1 µm to 50 µm. Further, when the ion conductor of the present invention is a Li ion conductor, a Li ion conductivity of the Li ion conductor (25° C.) is, for example, preferably $1 \times 10^{-7}$ S/cm or higher and more preferably $1 \times 10^{-5}$ S/cm or higher. Moreover, an electron conductance of the Li ion conductor (25° C.) is, for example, preferably $1 \times 10^{-12}$ S/cm or lower and more preferably lower than the measurement limit.

B. Solid State Battery

Next, a solid state battery of the present invention will be explained. The solid state battery of the present invention comprises: a cathode active material layer containing a cathode active material, an anode active material layer containing an anode active material, and a solid electrolyte layer formed between the cathode active material layer and the anode active material layer, wherein at least one of the cathode active material layer, the anode active material layer, and the solid electrolyte layer has the above-mentioned ion conductor.

According to the present invention, by using the above-mentioned ion conductor, it is possible to obtain a solid state battery having excellent output characteristics and high electrochemical stability.

FIG. 1 is a cross-schematic view illustrating one example of the solid state battery of the present invention. A solid state battery 10 shown in FIG. 1 comprises: a cathode active material layer 1 containing a cathode active material, an anode active material layer 2 containing an anode active material, a solid electrolyte layer 3 formed between the cathode active material layer 1 and the anode active material layer 2, a cathode current collector 4 collecting currents from the cathode active material layer 1, an anode current collector 5 collecting currents of the anode active material layer 2, and a battery case 6 for storing those members. A main characteristic of the solid state battery of the present invention is that at least one of the cathode active material layer 1, the anode active material layer 2, and solid electrolyte layer 3 contains the ion conductor explained in the above-section "A. ion conductor".

In particular, in the present invention, it is preferable that the solid electrolyte layer contains the above-mentioned ion conductor, and at least one of the cathode active material and the anode active material has the spinel structure. Thereby, it becomes possible to reduce the interface resistance between the solid electrolyte layer and the active material layer. In the present invention, by uniformly-applying the spinel structure, it becomes possible to continuously form the ion conductive path and lower the interface resistance. Further, from a view point of lowering the interface resistance, it is preferable that both of the cathode active material and the anode active material have spinel structures. Thereby, the ion conductive path is continuously formed through the whole battery and it is possible to obtain a high output solid battery.

Figure 2:
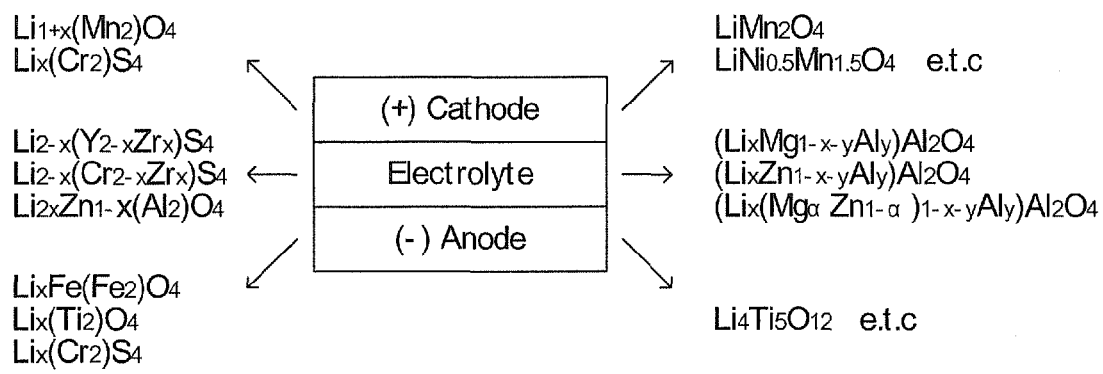
FIG. 2 is an explanatory diagram explaining the difference between the solid state battery of the present invention and the solid state battery described in the Patent Document 1 (U.S. Pat. No. 4,507,371).

Further, FIG. 2 is an explanatory diagram explaining the difference between a typical solid state battery of the present invention and the solid state battery described in the Patent Document 1 (U.S. Pat. No. 4,507,371). Each materials of the present invention explained in FIG. 2 are mere examples.

Firstly, in terms of the cathode active material layer, $Li_x(Cr_2)S_4$ disclosed in the Patent Document 1 does not explain its synthesis process so that it is impossible to synthesize it. As such, one cannot judge whether or not the material functions as an active material for the battery. In contrast thereto, $LiMn_2O_4$ of the present invention is an active material having a generally well-known spinel structure. Similarly thereto, $LiNi_{0.5}Mn_{1.5}O_4$ is an active material having a generally well-known spinel structure and is known as an active material having a high potential.

Next, in terms of the solid electrolyte layer, the three materials disclosed in the Patent Document 1 do not explain their synthesis processes so that it is impossible to synthesize them. As such, one cannot judge whether or not the materials function as solid electrolyte materials. In particular, although $Li_{2x}Zn_{1-x}(Al_2)O_4$ is similar to the above-mentioned ion conductor of the present invention, it has x number(s) of $Zn^{2+}$ substituted by double number of 2x numbers of Li so that it is difficult for Li ions to move and its Li ion conductivity becomes low. In contrast thereto, it is actually possible to synthesis the ion conductor of the present invention and an electrochemical activity (such as ion conductivity) thereof is confirmed. Moreover, the ion conductor of the present invention has a structure where (x+y) numbers of $M^{2+}$ is substituted by x number(s) of $A^+$ and y number(s) of $M'^{3+}$ so that it has an advantage that it is structurally easy for A ions to move.

Further next, in terms of the anode active material layer, $Li_xFe(Fe_2)O_4$ and $Li_x(Ti_2)O_4$ recited in the Patent Document 1 function as the anode active materials. On the other hand, $Li_x(Cr_2)S_4$ recited in the Patent Document 1 does not explain its synthesis process so that it is impossible to synthesize it. As such, one cannot judge whether or not it functions as an active material of the battery. In contrast thereto, $Li_4Ti_5O_{12}$ of the present invention is an active material having a generally well-known spinel structure. As it is an oxide, it has excellent heat-resistance.

Hereinafter, the solid state battery of the present invention will be explained by its structure.

1. Solid Electrolyte Layer

First, the solid electrolyte layer of the present invention will be explained. The solid electrolyte layer of the present invention comprises a solid electrolyte material which has ion conductivity. In the present invention, it is preferable that the solid electrolyte layer contains the above-mentioned ion conductor as the solid electrolyte material. Further, the solid electrolyte layer preferable contains the above-mentioned ion conductor by 30% weight or more, more preferably by 50% by weight or more, and further more preferably by 70% by weight or more. In particular, in the present invention, it is preferable that the solid electrolyte layer is constituted by the above-mentioned ion conductor only. Thereby, it becomes easy to form an ion conductive path. The solid electrolyte layer may contain other solid electrolyte material(s) apart from the above-mentioned ion conductor.

A thickness of the solid electrolyte layer is not particularly limited. For example, the thickness is preferably within the range of 0.1 µm to 1000 µm, and further preferably within the range of 0.1 µm to 300 µm.

2. Cathode Active Material Layer

Next, a cathode active material layer of the present invention will be explained. The cathode active material layer of the present invention contains at least a cathode active material. Further, the cathode active material layer may further contain at least one of the solid electrolyte material and a conductive material.

As examples of the cathode active material, an active material having a spinel structure, an active material having a rock salt structure, and an active material having an olivine structure can be cited. Among them, the active material having a spinel structure is preferable. Thereby, for example, when a solid electrolyte layer contains the above-mentioned ion conductor (the ion conductor having a spinel structure), an ion conductive path is continuously formed between the cathode active material layer and the solid electrolyte layer so that it becomes possible to reduce the interface resistance between two layers.

As an example of the active material which has a spinel structure and which can be used for a lithium solid state battery, an active material that satisfies the general formula $Li_aM_bO_c$ ("M" is at least one of the transition metal element, "a" to "c" satisfy relations: $0<x\leq2.0$, $1.5\leq b\leq2.5$, and $3\leq c\leq5$). Further, "N" is at least one selected from the group consisting of Mn, Co, and Ni. As specific examples of the active material having a spinel structure, $LiMn_2O_4$, $LiCoMnO_4$, $LiNi_{0.5}Mn_{1.5}O_4$, $LiCo_{0.5}Mn_{1.5}O_4$, $LiFe_{0.5}Mn_{1.5}O_4$, $LiCu_{0.5}Mn_{1.5}O_4$ are cited. Among them, $LiMn_2O_4$ and $LiNi_{0.5}Mn_{1.5}O_4$ are preferable because it is possible to obtain a solid state battery having a high capacity. Also, although $Li_4Ti_5O_{12}$ has a relatively low potential (oxidation-reduction potential to Li), it is possible to use $Li_4Ti_5O_{12}$ as the cathode active material when it is combined with an anode active material which has lower potential. Further, as examples of the active material having a rock salt structure and used for a lithium solid state battery which can be used for a lithium solid state battery, $LiCoO_2$, $LiNiO_2$, $LiMnO_2$, $LiCo_{1/3}Ni_{1/3}Mn_{1/3}O_2$, $LiVO_2$, and $LiCrO_2$ are cited. As examples of the active material having an olivine structure and used for a lithium solid state battery, $LiFePO_4$, $LiMnPO_4$ are cited.

As amount of the cathode active material contained in the cathode active material layer is not particularly limited. For example, the amount is preferably within the range of 1% by weight to 90% by weight and more preferably within the range of 10% by weight to 80% by weight. The cathode active material layer may be a layer which is constituted solely by the cathode active material.

Further, cathode active material layer of the present invention may further contain the solid electrolyte material which has the ion conductivity. By adding the solid electrolyte material, it is possible to improve the ion conductivity of the cathode active material layer. In particular, in the present invention, it is preferable that the cathode active material layer contains the above-mentioned ion conductor as the solid electrolyte material. For example, when a solid electrolyte layer contains the above-mentioned ion conductor, an ion conductive path is continuously formed between the cathode active material layer and the solid electrolyte layer so that it becomes possible to reduce the interface resistance between two layers. Further, when both of the cathode active material and the solid electrolyte material contained in the cathode active material layer have the spinel structure, there is an advantage that the ion conductivity within the cathode active material layer improves.

An amount of the solid electrolyte material contained in the cathode active material layer is not particularly limited. For example, the amount is preferably within the range of 1% by weight to 40% by weight, and more preferably within the range of 5% by weight to 20% by weight.

Further, the cathode active material layer of the present invention may further contain a conductive material which has electron conductivity. By adding the conductive material, it becomes possible to improve the electron conductivity of the cathode active material layer. As examples of the conductive material, materials such as acetylene black, Ketjen black, activated carbon, graphite, and carbon fiber are cited.

A thickness of the cathode active material layer is not particularly limited. For example, the thickness is preferably within the range of 0.1 μm to 1000 μm.

3. Anode Active Material Layer

Next, an anode active material layer of the present invention will be explained. The anode active material layer of the present invention contains at least an anode active material. Further, the anode active material layer may further contain at least one of the solid electrolyte material and the conductive material.

As examples of the anode active material, an active material having a spinel structure, a metal active material, and a carbon active material can be cited. Among them, the active material having a spinel structure is preferable. For example, when a solid electrolyte layer contains the above-mentioned ion conductor (the ion conductor having a spinel structure), an ion conductive path is continuously formed between the anode active material layer and the solid electrolyte layer so that it becomes possible to reduce the interface resistance between two layers.

As examples of the active material which has a spinel structure and is used for a lithium solid state battery, $Li_4Ti_5O_{12}$, $LiMn_2O_4$, and $Li_4Mn_5O_{12}$ are cited. Among them, $Li_4Ti_5O_{12}$ is preferable because it has little change in volume caused by insertion of Li ions and thereby, it is possible to obtain a solid state battery having excellent durability. When there is a difference in potential between the cathode active material and the anode active material, they function as a battery. Accordingly, by selecting the cathode active material having higher electric potential, it is possible to use the above-mentioned cathode active material as the anode active material. Further, as examples of the metal active material, In, Al, Si, and Sn can be cited. As examples of carbon active material, mesocarbon microbead (MCMB), high orientation graphite (HOPG), hard carbon, and soft carbon can be cited.

Figure 3:
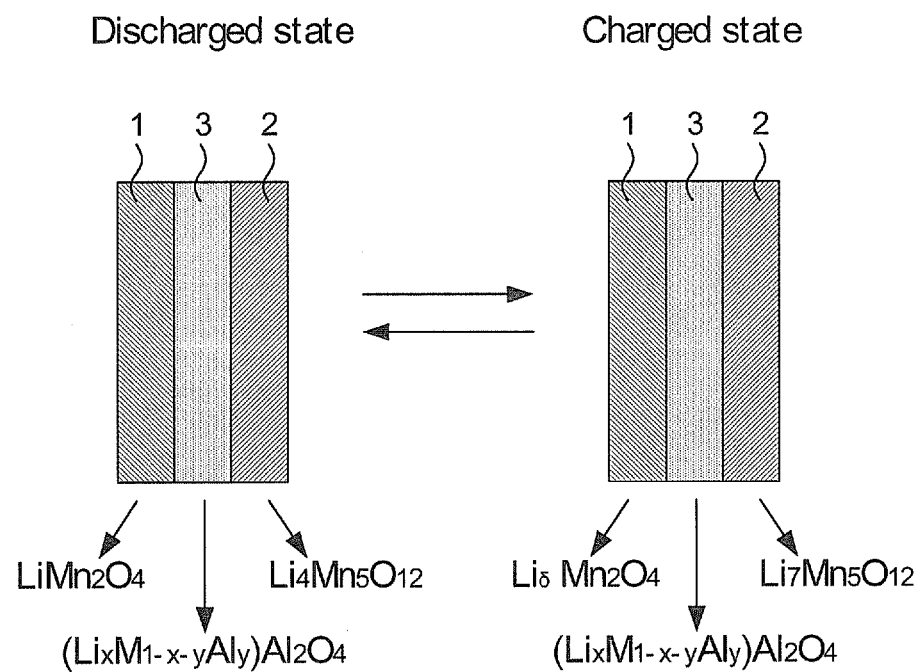
FIG. 3 is an explanatory diagram exemplifying the solid state battery of the present invention.

In particular, as shown in FIG. 3, it is preferable that a solid electrolyte layer 3 contains a Li ion conductor $((Li_xM_{1-x-y}M'_y)Al_2O_4)$, a cathode active material contained in a cathode active material layer 1 is $LiMn_2O_4$, and an anode active material contained in an anode active material layer 2 is $Li_4Ti_5O_{12}$. As these materials have the spinel structure, it becomes possible to continuously form a Li ion conductive path through the whole battery. Thereby, it is possible to obtain a high output solid battery. Further, when "M" is at least one of Mg and Zn and "M'" is Al, the size of each unit cells becomes about 8 Å which is about the same as those of $LiMn_2O_4$ and $Li_4Ti_5O_{12}$. Thus, it is thought possible to significantly reduce the interface resistance without causing stress to each interface between layers. Moreover, $Li_4Ti_5O_{12}$ has an advantage that it has less volume change caused by the insertion Li ions. In addition, the Li ion conductor $((Li_xM_{1-x-y}M'_y)Al_2O_4)$ has no change in its composition at the time of Li ion conduction. In view of the above, a solid battery excellent in durability is obtained when the above-mentioned materials are combined.

An amount of the anode active material contained in the anode active material layer is not particularly limited. For example, the amount is preferably within the range of 1% by weight to 90% by weight, and further preferably within the range of 10% by weight to 80% by weight. The anode active material layer may be a layer constituted only by the anode active material.

Further, the anode active material layer of the present invention may further contain a solid electrolyte material having ion conductivity. By adding the solid electrolyte material, it becomes possible to improve the ion conductivity of the anode active material layer. In particular, in the present invention, it is preferable that the anode active material layer contains the above-mentioned ion conductor as the solid electrolyte material. For example, when the solid electrolyte layer contains the above-mentioned ion conductor, an ion conductive path is continuously formed between the anode active material layer and the solid electrolyte layer so that it becomes possible to reduce the interface resistance between two layers. Further, when both of the anode active material and the solid electrolyte material contained in the anode active material layer have the spinel structure, there is an advantage that the ion conductivity within the anode active material layer improves.

An amount of the solid electrolyte material contained in the anode active material layer is not particularly limited. For example, the amount is preferably within the range of 1% by weight to 40% by weight, and further preferably within the range of 5% by weight to 20% by weight.

Further, the anode active material layer of present invention may further contain a conductive material which has electron conductivity. As the conductive material is the same as those explained in the above-section of "2. Cathode active material layer", explanation here is omitted.

A thickness of the anode active material layer is not particularly limited. For example, the thickness is preferably within the range of 0.1 μm to 1000 μm.

4. Other Structure

The solid state battery of the present invention comprises at least the above-mentioned solid electrolyte layer, cathode active material layer, and anode active material layer. In general, the solid sated battery of the present invention further comprise a cathode current collector for collecting currents from the cathode active material layer and an anode current collector for collecting currents from the anode active material layer. As examples of a material for the cathode current collector, SUS, aluminum, nickel, iron, titanium, gold, and carbon are cited, and among them, SUS is preferable. As examples of a material for the anode current collector, SUS, copper, nickel, gold, and carbon are cited, and among them, SUS is preferable. Further, it is preferable to appropriately select factors such as the respective thickness and shape of the cathode current collector and anode current collector according to application of the solid state battery and the like. Moreover, as for a battery case used in the present invention, a general battery case for a solid state battery is used. As an example of the battery case, a battery case made of SUS is cited.

5. Solid State Battery

The solid state battery of the present invention varies depending on the type of "A" of the above-mentioned general formula. It is preferably a lithium solid state battery, a sodium solid state battery, or, a potassium solid state battery, and more preferably a lithium solid state battery. Further, in the present invention, a power generating element constituted of the cathode active material layer/solid electrolyte layer/anode active material layer may be a sintered body. Thereby, it is possible to improve the adhering states of each layer and to further reduce an interface resistance. Further, the solid state battery of the present invention may be a primary battery or a secondary battery. Among them, it is preferably to be a secondary battery because it can be charged and discharged repeatedly and is useful for applications such as an in-car battery. As examples of a shape of the solid state battery of the present invention, a coin type, a laminated type, a cylindrical type, and a square type are cited. A method of producing a solid state battery of the present invention is not particularly limited as long as the method can produce the above-mentioned solid state battery and a method similar to the general producing method of a solid state battery can be used. For example, a method comprising the steps of: sequentially pressing a material constituting a cathode active material layer, a material constituting a solid electrolyte layer, and a material constituting an anode active material layer to thereby produce a power generating element; storing the power generating element in a battery case; and swaging the battery case, is cited. When producing the above-mentioned sintered body, the power generating element obtained by the pressing step is heated at high temperature. The current collector is preferably provided after the sintering process of the power generating element.

The present invention is not limited to the above-mentioned embodiments. Any modification which has substantially the same structure as these embodiments so as to embody the technical conception recited in the claims of the invention and which produces the same effects and advantages as the embodiments is included in the technical scope of the invention.

EXAMPLES

Hereinafter, the present invention is further specifically explained by way of examples.

Example 1

A $LiNo_3$ aqueous solution, a $Mg(No_3)_2$ aqueous solution, and a $Al(No_3)_3$ aqueous solution, each has a density of 1 mol/l, were prepared, weighed respectively by the predetermined stoichiometric proportion, added with water to mix at 50° C. Thereby, a precursor solution was obtained. Next, $NH_4OH$ was slowly dropped until pH of the obtained precursor solution became 12.5 and the resultant was kept for one night at 50° C. to obtain a gel-state precursor material. Then, the gel-state precursor was heat-treated at 900° C. for 12 hours to obtain a white ion conductor. This ion conductor had a composition of $(Li_{0.05}Mg_{0.90}Al_{0.05})Al_2O_4$.

Example 2

An ion conductor was obtained in the same manner as in Example 1 except that $Zn(NO_3)_2$ was used instead of $Mg(NO_3)_2$. This ion conductor had a composition of $(Li_{0.05}Zn_{0.90}Al_{0.05})Al_2O_4$.

Example 3

A $LiNo_3$ aqueous solution, a $Mg(NO_3)_2$ aqueous solution, a $Zn(No_3)_2$ aqueous solution, and a $Al(NO_3)_3$ aqueous solution, each has a density of 1 mol/l, were prepared, weighed respectively by the predetermined stoichiometric proportion, added with water to mix at 50° C. Thereby, a precursor solution was obtained. An ion conductor was obtained in the same manner as in Example 1 except that this precursor solution was used. This ion conductor had a composition of $(Li_{0.05}Mg_{0.5}Zn_{0.5})_{0.90}Al_{0.05})Al_2O_4$.

[Evaluation]

(1) X-Ray Diffraction Measurement

Figure 4:
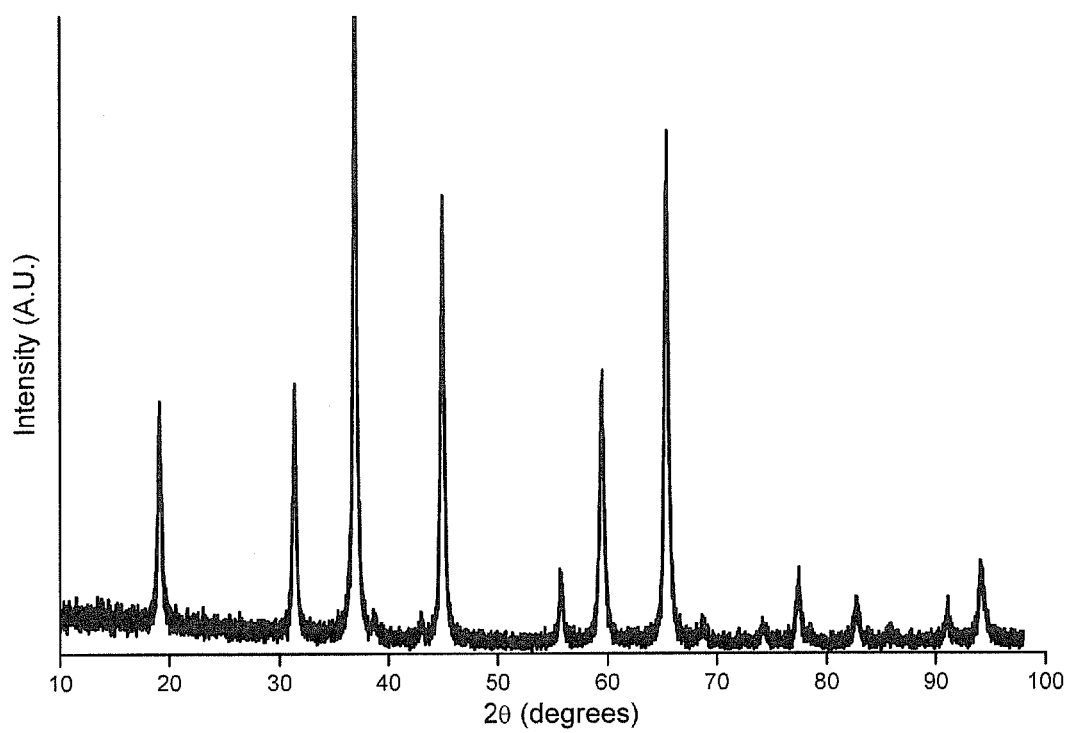
FIG. 4 shows results obtained by an X-ray diffraction measurement conducted to the ion conductor obtained in Example 1.

An X-ray diffraction measurement (CuK α) was conducted to the ion conductor obtained in Example 1. The results are shown in FIG. 4. From the peak patterns illustrated in FIG. 4, it was confirmed that the ion conductor obtained in Example 1 has a spinel structure.

(2) MAS-NMR Measurement

Figure 5:
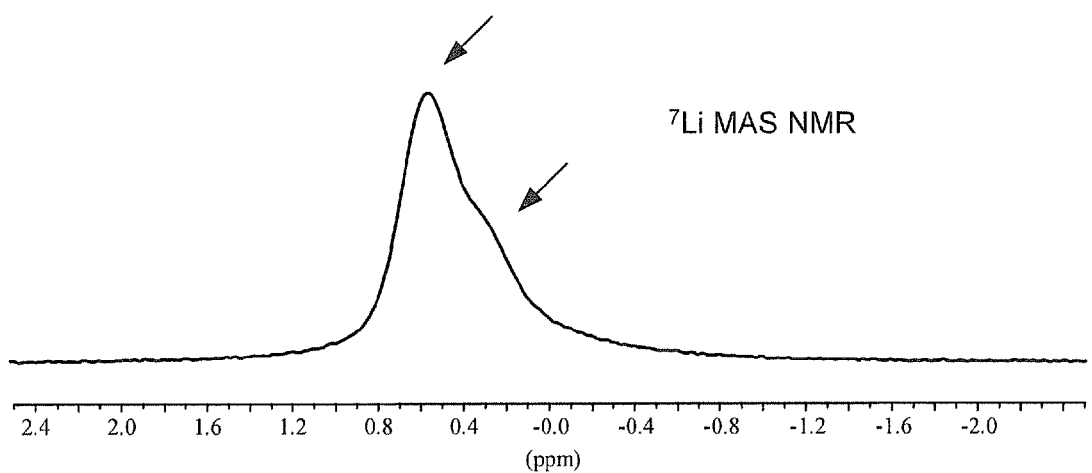
FIG. 5 shows results obtained by a $^7LiMAS$-NMR measurement conducted to the ion conductor obtained in Example 1.
Figure 6:
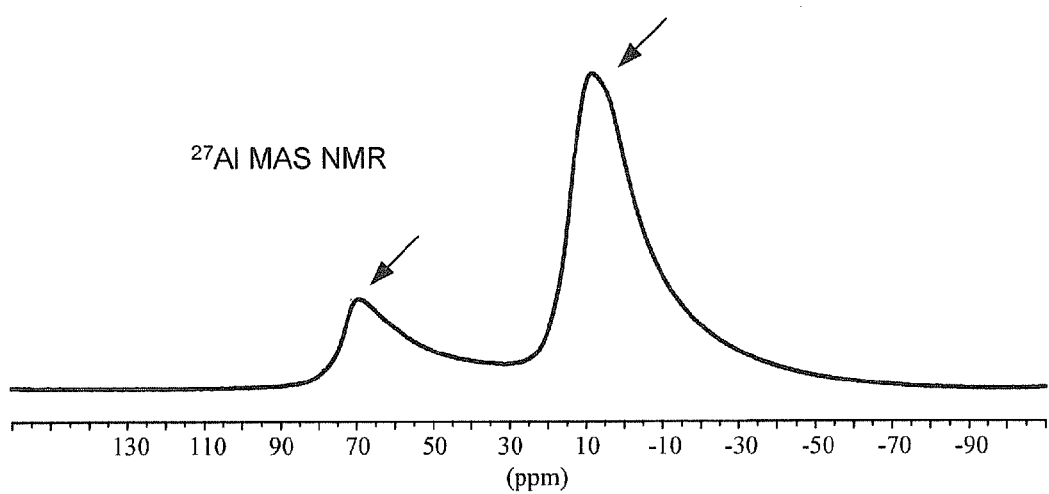
FIG. 6 shows results obtained by a $^{27}AlMAS$-NMR measurement conducted to the ion conductor obtained in Example 1.

AMAS-NMR (Magic Angle Spinning Nuclear Magnetic Resonance) measurement was conducted to the ion conductor obtained in Example 1. In the MAS-NMR measurement, a $^7$LiMAS-NMR measurement and a $^{27}$AlMAS-NMR measurement were carried out. Results of these are shown in FIGS. 5 and 6. From the results of FIGS. 5 and 6, it was confirmed that Li and Al were present as the constituting compositions of the ion conductor. Further, it was confirmed that each of FIGS. 5 and 6 have two peaks therein. From this result, it was confirmed that Li and Al were present respectively in both of A site and B site.

(3) Li Ion Conductivity Measurement

Figure 7:
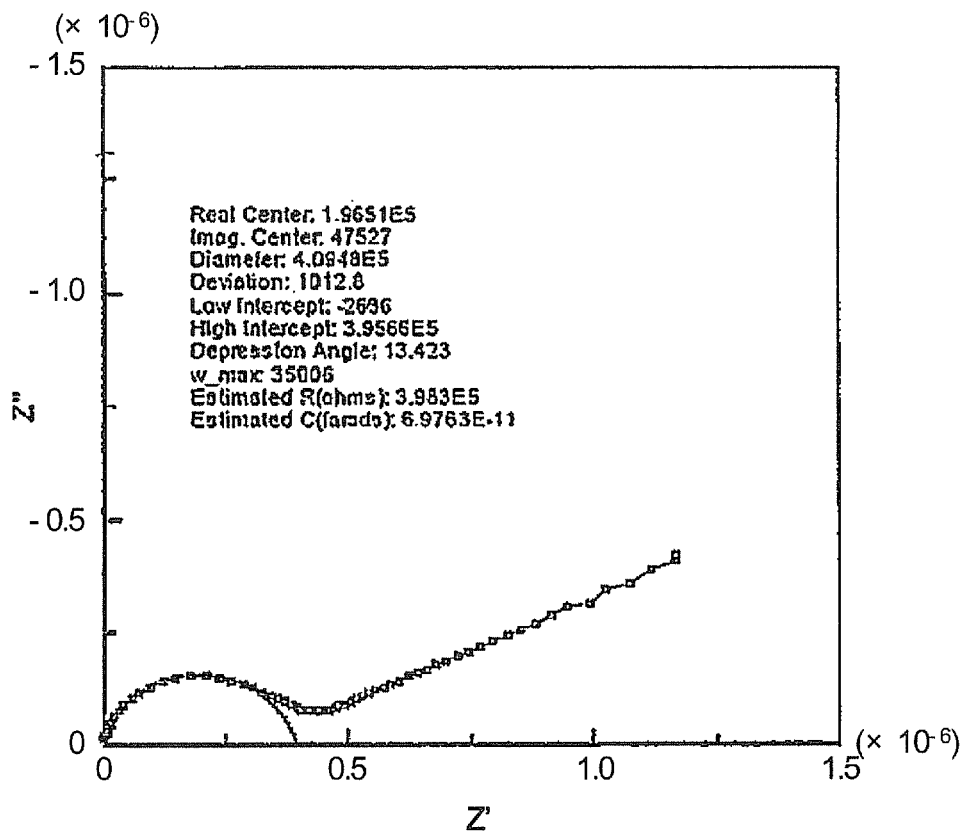
FIG. 7 shows results obtained by an ion conductivity measurement conducted to the ion conductor obtained in Example 1.

Li ion conductivity of the ion conductor obtained in Example 1 was measured by an alternating-current impedance method. The results are shown in FIG. 7. From the obtained Cole-Cole plot, it was confirmed that the Li ion conductivity of the ion conductor was $10^{-7}$ S/cm at room temperature (25° C.).

(4) Charge-Discharge Properties

Figure 8:
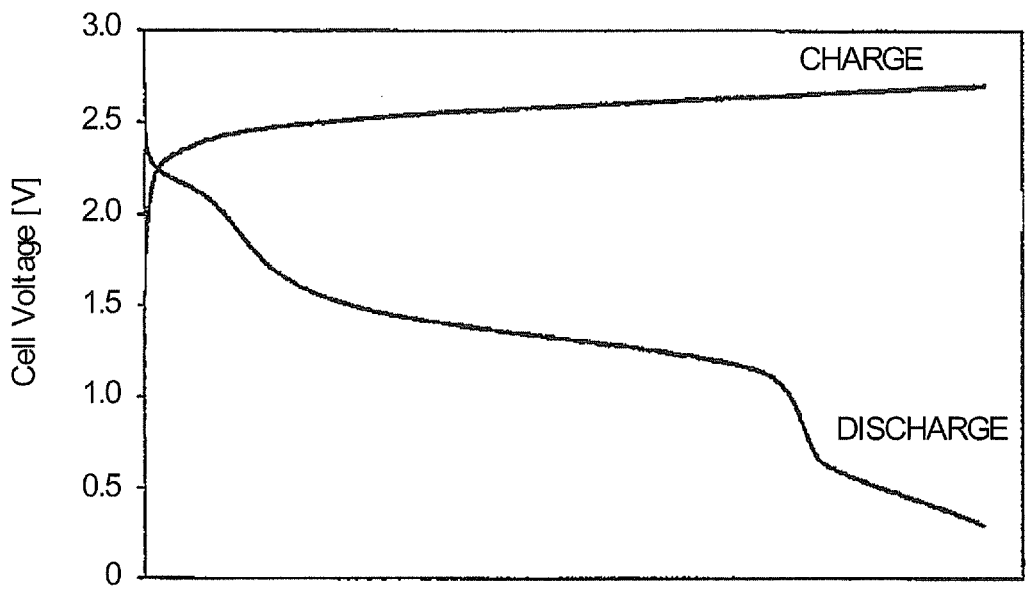
FIG. 8 is a table showing charge and discharge curves of the evaluation battery using the ion conductor obtained in Example 1.

Using the ion conductor obtained in Example 1, a battery for evaluation was produced. The ion conductor obtained in Example 1 was used for a solid electrolyte layer. Further, LiMn$_2$O$_4$ was used for a cathode active material layer and Li$_4$Ti$_5$O$_{12}$ was used for an anode active material layer. Using these materials, a battery for evaluation was produced. Charge and discharge curves of the battery for evaluation obtained are shown in FIG. 8. As shown in FIG. 8, it was confirmed that the battery for evaluation showed charge and discharge behavior and was effective as a secondary battery.

DESCRIPTION OF REFERENCE NUMERAL

1 . . . Cathode active material layer
2 . . . Anode active material layer
3 . . . Solid electrolyte layer
4 . . . Cathode current collector
5 . . . Anode current collector
6 . . . Battery case
10 . . . Solid state battery

The invention claimed is:

1. An ion conductor represented by a general formula: $(A_xM_{1-x-y}M'_y)Al_2O_4$ ("A" is a monovalent metal, "M" is a bivalent metal, "M'" is a trivalent metal, and "x" and "y" satisfy the relations: 0<x<1, 0<y<1, and x+y<1) and having a spinel structure.

2. The ion conductor according to claim 1, wherein a relation x=y is established in the general formula.

3. The ion conductor according to claim 1, wherein the "A" is Li$^+$ in the general formula.

4. The ion conductor according to claim 1, wherein the "M" is at least one of Mg$^{2+}$ and Zn$^{2+}$ in the general formula.

5. The ion conductor according to claim 1 wherein the "M'" is Al$^{3+}$ in the general formula.

6. A Solid state battery comprising:
a cathode active material layer containing a cathode active material,
an anode active material layer containing an anode active material, and
a solid electrolyte layer formed between the cathode active material layer and the anode active material layer,
wherein at least one of the cathode active material layer, the anode active material layer, and the solid electrolyte layer has the ion conductor of claim 1.

7. The solid state battery according to claim 6, wherein the solid electrolyte layer contains the ion conductor, and at least one of the cathode active material and the anode active material has the spinel structure.

8. The solid state battery according to claim 7, wherein the ion conductor is a Li ion conductor, the cathode active material which has the spinel structure is LiMn$_2$O$_4$, and the anode active material which has the spinel structure is Li$_4$Ti$_5$O$_{12}$.

* * * * *